US011866301B2

(12) United States Patent
Kasbergen et al.

(10) Patent No.: US 11,866,301 B2
(45) Date of Patent: Jan. 9, 2024

(54) FOLDING SYSTEM FOR STAIRLIFT

(71) Applicant: TK Home Solutions B.V., Krimpen aan den IJssel (NL)

(72) Inventors: Paul Kasbergen, Capelle aan den IJssel (NL); Maarten Dubbeld, Barendrecht (NL); Sjaak Wisse, Krimpen aan den Ijsssel (NL); Matt Rebel, Rotterdam (NL)

(73) Assignee: TK HOME SOLUTIONS B.V., Krimpen aan den IJssel (NL)

( * ) Notice: Subject to any disclaimer, the term of this patent is extended or adjusted under 35 U.S.C. 154(b) by 0 days.

(21) Appl. No.: 17/998,335

(22) PCT Filed: May 18, 2021

(86) PCT No.: PCT/EP2021/063103
§ 371 (c)(1),
(2) Date: Nov. 9, 2022

(87) PCT Pub. No.: WO2021/239506
PCT Pub. Date: Dec. 2, 2021

(65) Prior Publication Data
US 2023/0227289 A1 Jul. 20, 2023

(30) Foreign Application Priority Data
May 29, 2020 (EP) .................................... 20177317

(51) Int. Cl.
*B66B 9/08* (2006.01)

(52) U.S. Cl.
CPC .......... *B66B 9/0853* (2013.01); *B66B 9/0807* (2013.01)

(58) Field of Classification Search
CPC ............................ B66B 9/0853; B66B 9/0807
See application file for complete search history.

(56) References Cited

U.S. PATENT DOCUMENTS 4,913,264 A * 4/1990 Voves ........................ B66B 9/08 297/344.22
10,081,517 B1 * 9/2018 Cheng .................. B66B 9/0853
(Continued)

FOREIGN PATENT DOCUMENTS

CN 101994450 A 3/2011
CN 105460745 A 4/2016
(Continued)

OTHER PUBLICATIONS

International Search Report for International Application No. PCT/EP2021/063103, dated Aug. 5, 2021.
(Continued)

*Primary Examiner* — Jeffrey Donels
(74) *Attorney, Agent, or Firm* — Dinsmore & Shohl LLP

(57) ABSTRACT

A foldable stairlift includes a rail, a carrier that drives along the rail and a chair supported by the carrier. The chair and carrier define a stairlift unit. The chair includes a base body coupled to the carrier, a foldable seat body coupled to the base body, a foldable leg body coupled to the seat body, a foldable footrest body coupled to the leg body, a back rest body coupled to the base body, and a foldable armrest body coupled to the backrest body. Each of the seat body, leg body, and footrest body have their own respective folding system that controls the folding and unfolding of their respective seat body, leg body, and footrest body. And each folding system is controlled by an assigned motor that operates according to a variable speed profile. A method of controlling the folding and unfolding action of the foldable stairlift includes operating the motors according to one or more speed profiles.

12 Claims, 6 Drawing Sheets

(56) References Cited

U.S. PATENT DOCUMENTS

| | | | | |
|---|---|---|---|---|
| 11,261,061 | B2 | 3/2022 | Van Eijgen | |
| 2007/0272487 | A1 | 11/2007 | Vroegindeweij | |
| 2008/0203775 | A1 * | 8/2008 | Caroen | B66B 9/08 297/30 |
| 2020/0172378 | A1 * | 6/2020 | Van Eijgen | B66B 9/0807 |
| 2020/0231411 | A1 * | 7/2020 | Foggio, Jr. | B66B 9/0853 |

FOREIGN PATENT DOCUMENTS

| | | | |
|---|---|---|---|
| CN | 206777106 | U | 12/2017 |
| CN | 107561500 | A | 1/2018 |
| CN | 110499992 | A | 11/2019 |
| CN | 107814294 | A | 6/2020 |
| CN | 110869304 | A | 8/2022 |
| DE | 19513920 | A1 | 10/1996 |
| EP | 3428104 | A1 | 1/2019 |
| KR | 20190040618 | A1 | 4/2019 |
| WO | 2019/011884 | A1 | 1/2019 |
| WO | 2019/197841 | A1 | 10/2019 |

OTHER PUBLICATIONS

Extended European Search Report in priority application No. EP 20177317.3, dated Nov. 13, 2020.

* cited by examiner a)

b)

a)

b)

Fig. 4a
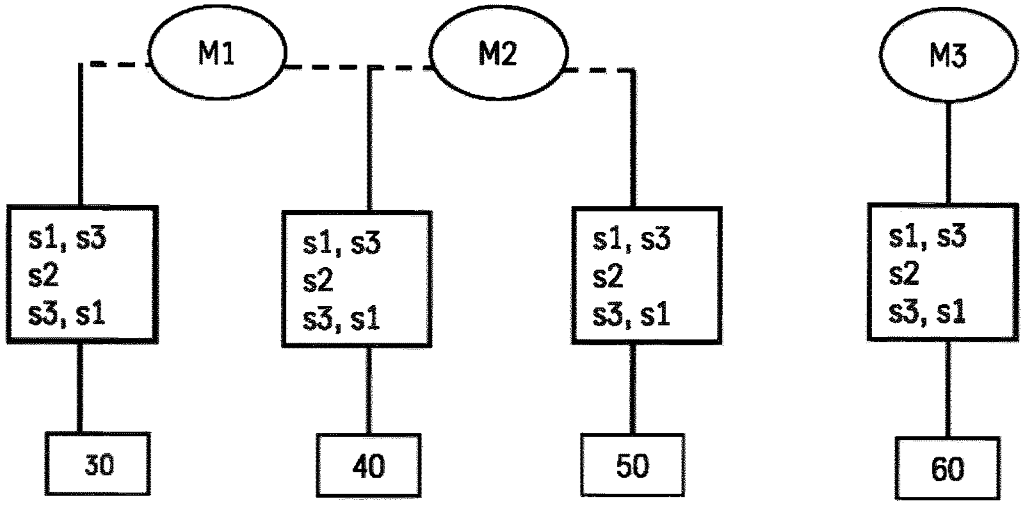
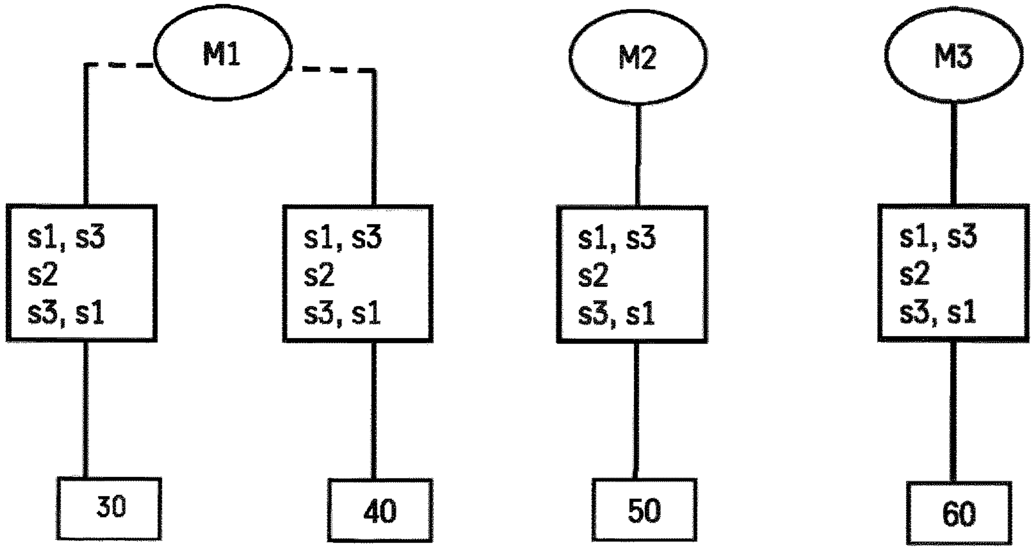
Fig. 4b

FOLDING SYSTEM FOR STAIRLIFT

CROSS REFERENCE TO RELATED APPLICATIONS

This application is a U.S. National Stage Entry of International Patent Application Serial Number PCT/EP2021/063103, filed May 18, 2021, which claims priority to European Patent Application No. EP 20177317.3, filed May 29, 2020, the entire contents of each of which are incorporated herein by reference.

FIELD

The present disclosure generally relates to a foldable stairlift, a system for folding the foldable stairlift, and a method of controlling a stairlift.

BACKGROUND

A stairlift is a product which is typically meant for people with impaired mobility to provide support in travelling up and down a staircase whilst maintaining the functionality of the stairs for persons who are able to climb the stairs themselves. The stairlift is often installed in a person's home and typically comprises a drive unit that is arranged to drive a user carrier, e.g., a chair or a wheelchair platform, along a rail, mounted on or along one or more flights of a staircase.

EP 3428104 A1 discloses a stairlift wherein the folding of the seat and/or, the chair leg and/or the footrest and/or the armrest is/are folded/unfolded automatically or manually. This is designed to save space about the stairlift installation.

DE19513920A1 discloses a stairlift in which movement is regulated according to an entered velocity profile data. However this movement refers to the lift motor as such and not to a folding mechanism.

WO 2019/197841 discloses a folding chair having a seat base, a backrest and a pair of armrests, said chair further including a linkage connecting said seat base and said armrests, wherein the linkage is configured to regulate the displacement of said seat base between a substantially horizontal in-use position and a folded position in which the rear end is raised relative to the backrest.

The movements of folding component parts of a stairlift, e.g., a footrest; a chair seat; a chair leg, can also be accomplished by means of electro motors, wherein each electro motor is assigned to a specific component part(s). However, when the motors are switched on or off, the folding behavior is bulky, inelegant and inefficient.

Thus a need exists for an improved folding and unfolding system for the folding and unfolding of component parts in a foldable stairlift.

BRIEF DESCRIPTION OF THE FIGURES

FIG. 4*a* is a schematic diagram of an embodiment of operation controls between the motors and their respective component parts of a stairlift of the present disclosure.

FIG. 4*b* is a schematic diagram of an embodiment of operation controls between the motors and their respective component parts of a stairlift of the present disclosure.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a foldable stairlift, a system for folding the foldable stairlift, and a method of controlling a stairlift.

A stairlift of the present disclosure includes a curved or a straight rail, comprising

- a rail,
- a stairlift unit, said stairlift unit comprising a chair and a carrier, wherein the carrier is adapted to drive along the rail, and the chair is supported by the carrier, the chair comprising a plurality of foldable parts, said foldable parts including:
- a seat body, foldably fixed by means of a seat joint to a base body, wherein the base body is fixed to the carrier;
- a leg body, foldably fixed to the seat body by means of a leg joint;
- a footrest body, foldably fixed to the leg body by means of a footrest joint;
- an armrest body, foldably fixed to a backrest body;
- characterized in that the seat body, the leg body, the footrest body and optionally the armrest body:
- each comprise a folding system which is adapted to fold and unfold, preferably automatically fold and unfold, at least one of the seat body, the leg body, the footrest body; and wherein each folding system is adapted to be controlled via an assigned motor;

wherein

- each motor is adapted to control the corresponding folding system according to a variable speed profile, wherein a variable speed profile can comprise a variable speed profile or a combination of a variable and a constant speed profile.

This advantageously provides a stairlift that can be easily configured by folding and unfolding one or more movable part to welcome a travelling passenger, as well as enabling a stairlift to be quickly and efficiently stored once a passenger has reached their destination.

Figure 2:
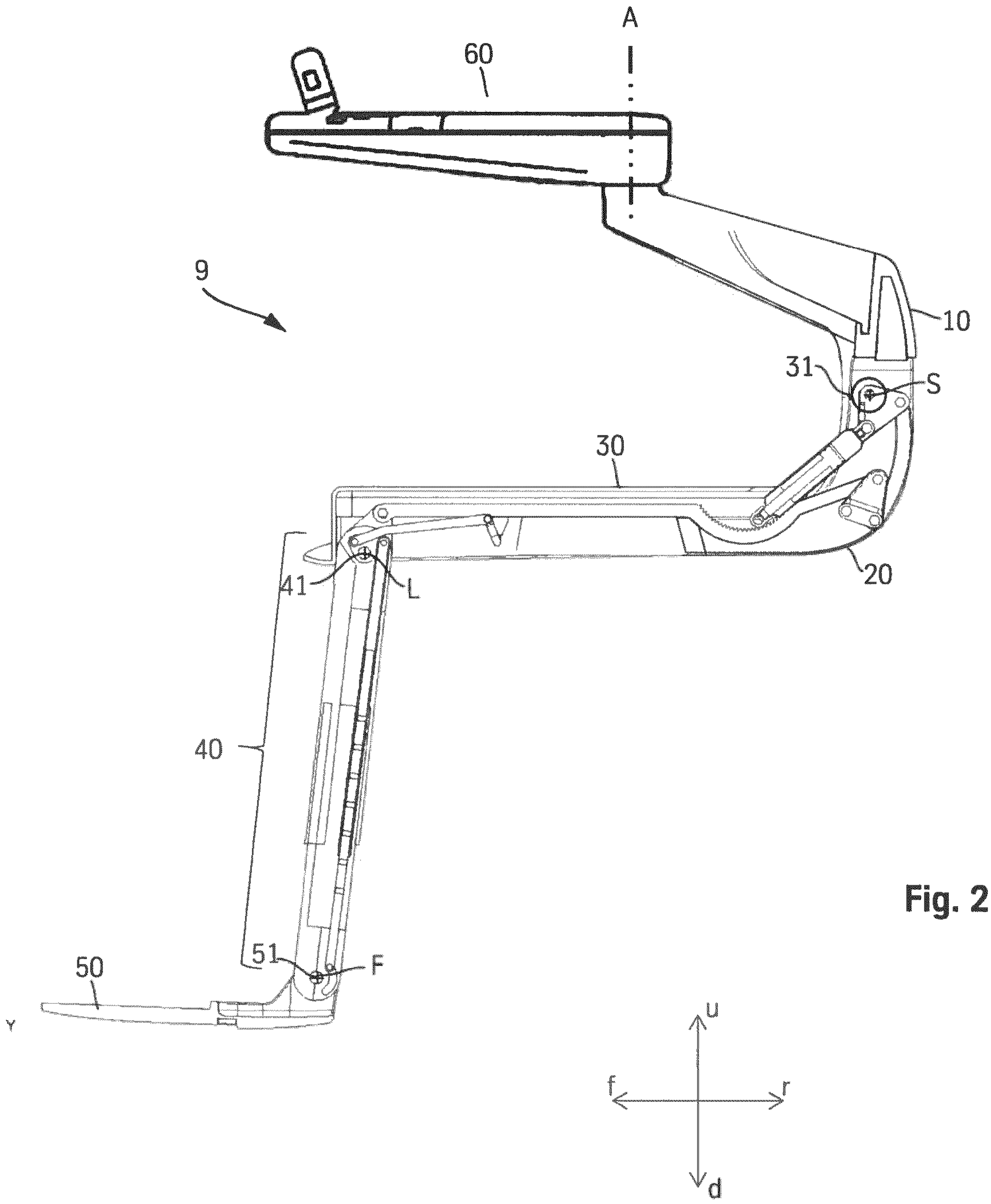
FIG. 2 is a right side view of an embodiment of a folding mechanism of a stairlift of the present disclosure.

The term "folding" preferably refers to the movement of one body, e.g., a seat body, from a first position to a second position, wherein said positions are different. For example, folding can refer to the movement of the seat body from a forwards position (see. FIG. 2 for directional arrows) to an upwards position, wherein the forwards and upwards positions are not necessarily exactly perpendicular to each other.

In an embodiment of the invention, a first motor is adapted to control a folding system comprised in the seat body and a folding system comprised in the leg body.

In an embodiment of the invention, a second motor is adapted to control a folding system comprised in the footrest body.

In an embodiment of the invention, a third motor is adapted to control a third folding system comprised in the armrest body.

By providing each movable part of the stairlift with its own folding system, there are more options for customizing the folding and unfolding of the stairlift to suit customer wishes.

In an embodiment of the invention, each motor is adapted to implement at least:

a first speed profile;
a second speed profile;
a third speed profile.

In an embodiment of the invention, the first speed profile and the third speed profile are variable speed profiles, wherein said variable speed profiles are not necessarily the same.

In an embodiment of the invention, the second speed profile is a constant or a variable speed profile.

By incorporating variable speeds and constant speeds, time can be saved when preparing the stairlift for use or for preparing it for storage. This advantageously increases passenger satisfaction.

The invention also refers to a method for controlling a stairlift as outlined above comprising the method steps of:

a. activating at least one of
   a first motor;
   a second motor;
   a third motor;

Activation can optionally occur by pushing a button on an armrest, or a remote control device, or a control panel, which activates the first and/or second motor, e.g., the seat/leg folding motor and/or the footrest body motor and/or the armrest body motor.

b. initiating at least one motor a:
   b1. a first speed profile;
   b2. a second speed profile;
   b3. a third speed profile
   wherein
      at least the first and third speed profiles are variable speed profiles wherein the variable speed profiles are not necessarily the same.

This advantageously provides a simple method for controlling the folding and unfolding of a stairlift, which improves usability and comfort for passengers.

In an embodiment of the invention, the first speed profile involves a speed acceleration.

In an embodiment of the invention, the second speed profile involves a constant or variable speed.

In an embodiment of the invention, the third speed profile involves a speed deceleration By incorporating variable speeds and constant speeds, time can be saved when preparing the stairlift for use or for preparing it for storage. This advantageously increases passenger satisfaction.

In an embodiment of the invention, at least one motor is activated via:

a button on an armrest;
a remote control device;
a control panel on the stairlift unit.

This advantageously ensures that the folding and unfolding function can be easily operated by a passenger or a helper, reducing complexity and improving passenger comfort.

In an embodiment of the invention, performing the method steps in the order b1-b2-b3 results in a folding operation or an unfolding operation.

Figure 1:
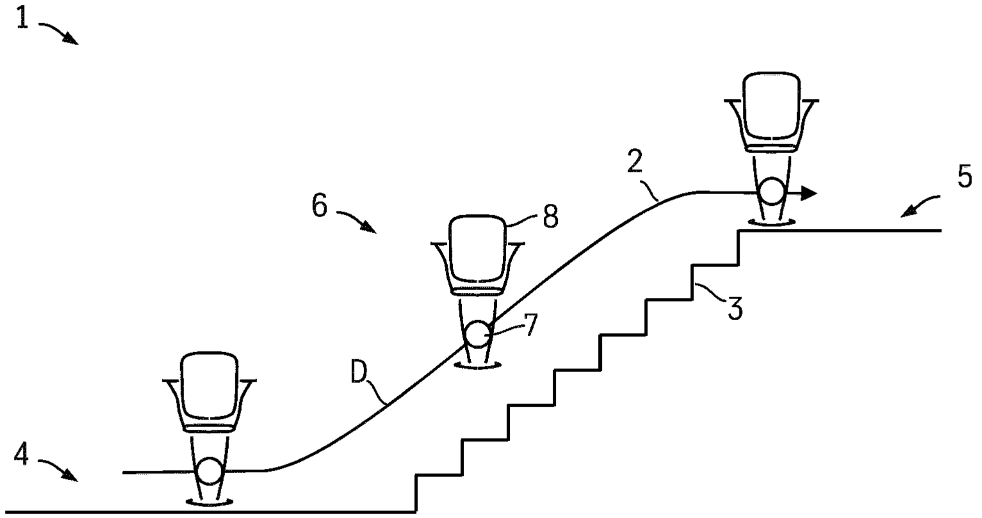
FIG. 1*a* is a schematic front view of a generic stairlift.
FIG. 1*b* is a schematic front view of an embodiment of a generic chair of the stairlift of FIG. 1.
Figure 1:
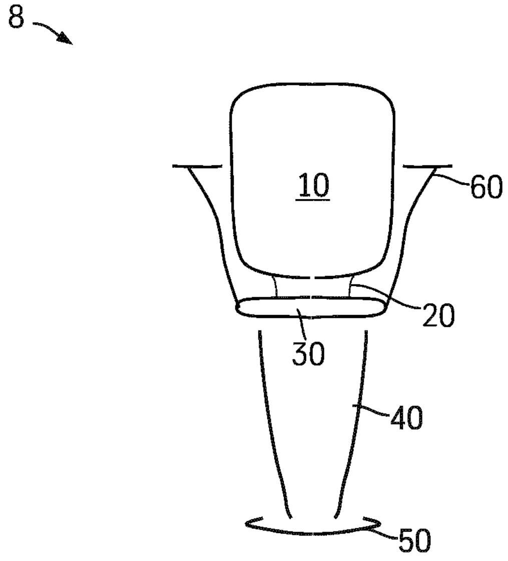

FIGS. 1*a* and 1*b* show exemplary embodiments of a generic stairlift 1, to which the invention can be applied. The stairlift 1 comprises a stairlift unit 6 which travels along a direction of travel D from a first landing area 4 to a second landing area 5. The direction of travel D is defined by a rail 2 and is limited mainly by the course of an existing stairway 3 in a house. The stairlift unit 6 comprises a carrier 7, which serves for guiding the stairlift unit 6 at the rail and which has a drive engine (not shown). Attached to the carrier is a chair/seat 8. The carrier 7 has non-shown rollers, which roll along the rail 2. For driving the carrier 7 positive engagements means (not shown) are provided on the rail 2, which cooperates with driving means, in particular a driven pinion (not shown), of the stairlift unit 6. This particular rail 2 has a curved shape, which deviates from a straight line; thus the direction of travel will change at least once during the course of the rail 2. A leveling mechanism (not shown) is provided on the stairlift unit 6, to keep the chair 8 always in a horizontal orientation, even if the inclination of the rail 2 varies during its course.

FIG. 1*b* shows the chair 8 wherein it comprises a base body 20, which is attached to the carrier 7. Attached to the base body 20 is a backrest body 10, a seat body 30 and an armrest body 60.

The user sits on the seat body 30 during travel and rests their arms on the armrests 60. Therefore the seat body 30 and armrest body 60 may be equipped with a suitable cushion.

The chair 8 also comprises a footrest body 50, on which during travel a user can rest his feet on. For attaching the footrest body 50 at the rest of the chair 8 a leg body 40 is provided attaching the footrest body 50 with the seat body 30.

FIG. 2 shows the respective folding axes S, F, L, A, relating to the component parts of the seat body 30, the leg body 40 and the footrest body 50. The seat body 30 is foldable along a seat axis S fixed to the base body 20 by a seat joint 31. The seat joint 31 is located at a rearward section of the seat body 30.

The leg body 40 is foldable along a leg axis L fixed to the seat body 30 by a leg joint 41. The leg joint 41 is located at an upper section of the leg body 40 and at a forward section of the seat body 30.

The footrest body 50 is foldable along a footrest axis F fixed to the leg body 40 by a footrest joint 51. The footrest joint 51 is located at a lower section of the leg body 40 and at a rearward section of the footrest body 50.

The armrest body 60 is foldable along a vertical axis A. Each of the foldable bodies shown 30, 40, 50, 60 comprise a folding system 100 (not shown).

The terms rearward, forward, upward, downward are relative to a user's point of view when sitting on the unfolded chair 8. The corresponding directions "rearward direction r", "forward direction f", "upward direction u" and "downward direction d" are shown in FIG. 2. As can be seen with reference to the leg body 40 in particular, these directions indicate an approximate direction rather than an exact orthogonal direction.

Figure 3:
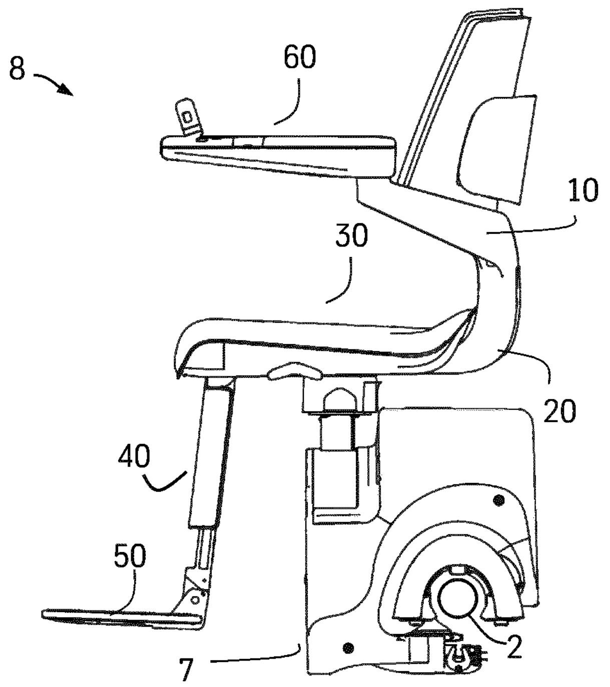
FIG. 3*a* is a right side view of an embodiment of a chair of a stairlift of the present disclosure, in which the chair is in an unfolded state.
FIG. 3*b* is a right side view of an embodiment of a chair of a stairlift of the present disclosure, in which the chair is in a folded state.
Figure 3:
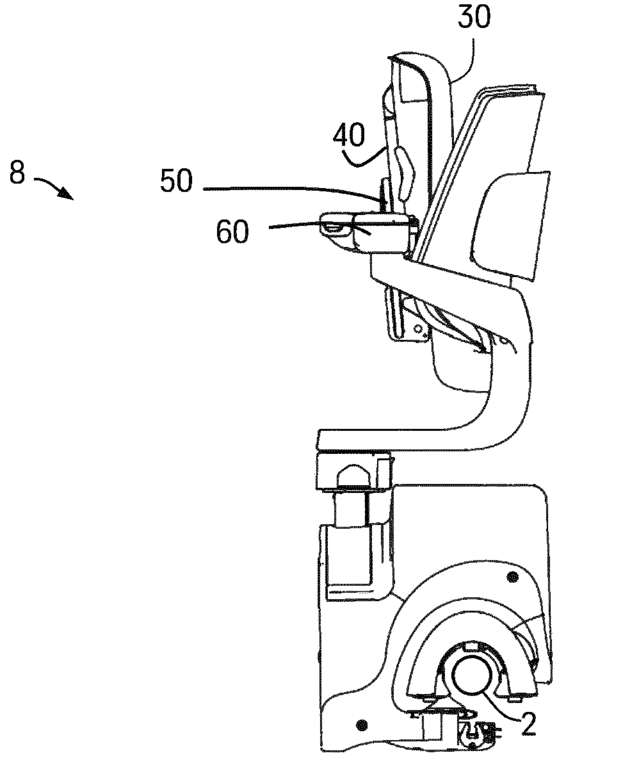

FIG. 3 shows the chair 8 when in a folded (FIG. 3*b*) and unfolded (FIG. 3*a*) configuration.

FIG. 4*a* shows a schematic of the motor controls M1, M2 and their respective component parts 30, 40, 50 according to an embodiment of the invention. In FIG. 4*a*, the motor M1, when activated, controls the folding and unfolding of the seat body 30 and the leg body 40, whilst the motor M2 when activated, controls the folding and unfolding of the footrest body 50. As a first step, a first speed profile s1, s3 is initiated at one or both motors M1, M2. This speed profile will vary depending on whether a folding or unfolding operation is being carried out. If it is an unfolding operation, then the first speed profile is profile s1 and relates to a speed acceleration. The next speed profile implemented is profile s2, which relates to a constant speed, and finally the third speed profile implemented is profile s3, which relates to a speed deceleration. The motors M1, M2 can be activated at different times or at the same time. Optionally a folding system 100 can also be comprised in the armrest body 60 which is controlled by a motor M3. The motor M3 can be optionally coupled to the other motors M1, M2, however, the motor M3 shown here is not coupled to the motors M1 and M2, thus, the folding system of the armrest is independent of the folding systems comprised in the seat, leg and footrest bodies 30, 40, 50. The armrest body 60 can also be folded and unfolded manually—thus removing the need for the motor M3.

FIG. 4*b* shows a schematic of the motor controls M1, M2, M3 and their respective component parts 30, 40, 50, 60 according to an embodiment of the invention. In FIG. 4*a*, the motor M1, when activated, controls the folding and unfolding of the seat body 30 and the leg body 40; the motor M2 when activated, controls the folding and unfolding of the footrest body 50; and the motor M3 when activated, controls the folding and unfolding off the armrest body 60. As a first step, a first speed profile s1, s3 is initiated at one or all motors M1, M2, M3. This speed profile will vary depending on whether a folding or unfolding operation is being carried out. If it is an unfolding operation, then the first speed profile is profile s1 which relates to a speed acceleration. The next speed profile to be implemented is profile s2, which relates to a constant speed, and finally the third speed profile implemented is profile s3, which relates to a speed deceleration. The motors M1, M2, M3 can be activated at different times or at the same time.

Figure 5A:
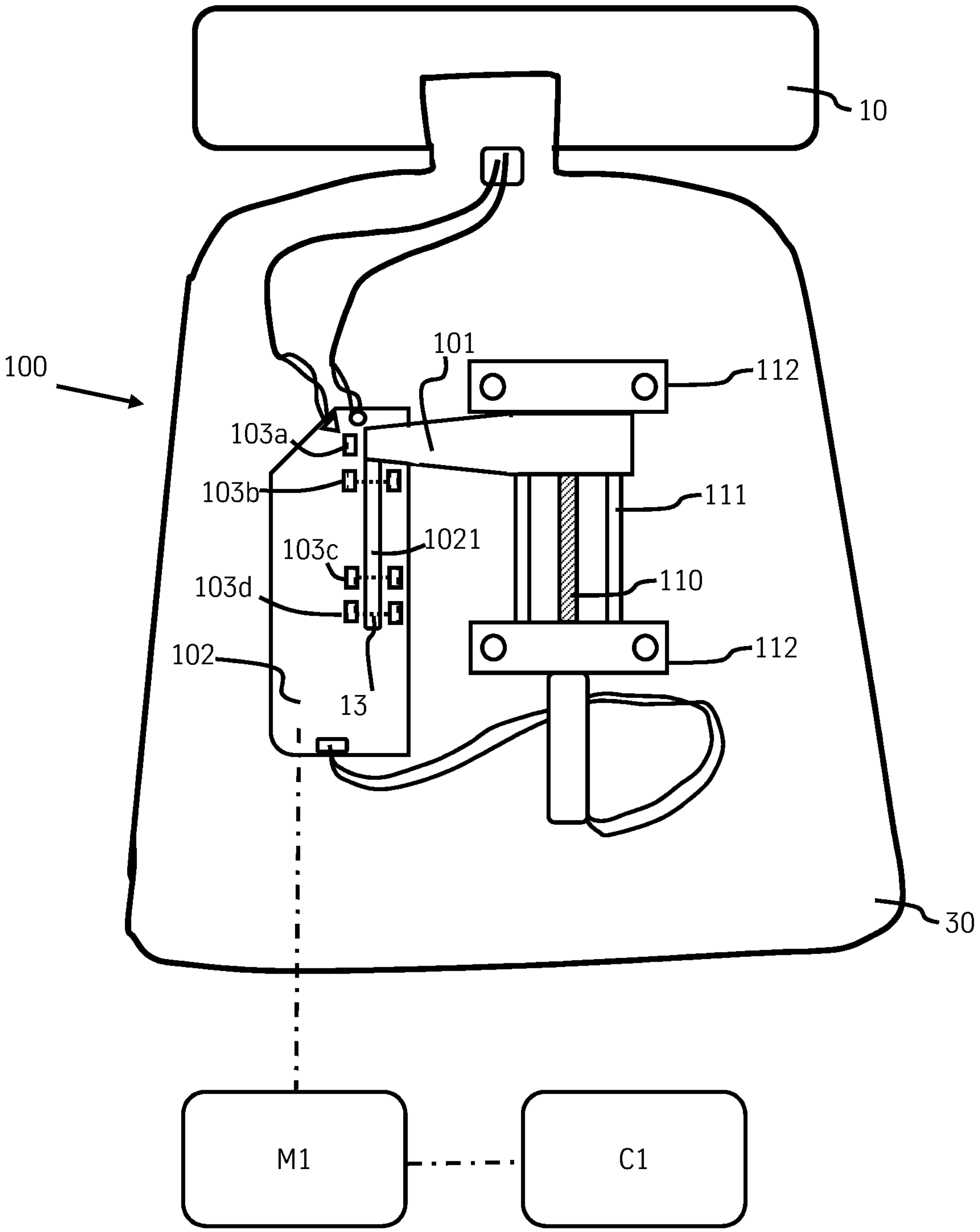
FIG. 5*a* is a schematic top view of an embodiment of a folding system in a seat body of a stairlift of the present disclosure with the seat body in an unfolded state.
Figure 5B:
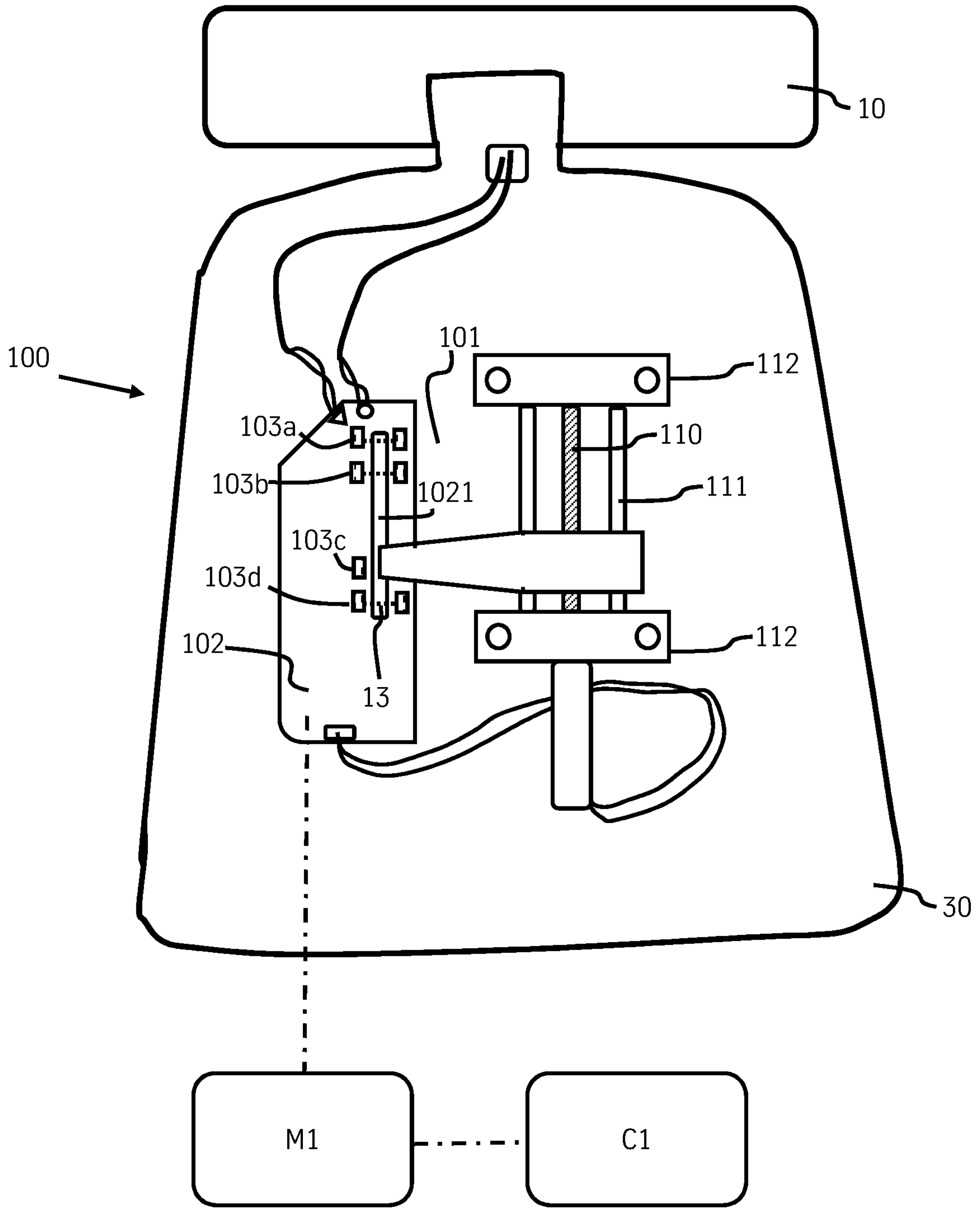
FIG. 5*b* is a schematic top view of an embodiment of a folding system in a seat body of a stairlift of the present disclosure with the seat body partially folded state.

FIGS. 5*a* and 5*b* show a schematic top view representation of a folding system 100 according to an embodiment of the invention. The folding system 100 comprises both mechanical components and electronic components which together are designed to fold e.g., the leg body 40 with the seat body 30. In the example shown in FIG. 5*a*, the folding system 100 is comprised in the seat body 30. It should be noted that this is not to scale. The folding system 100 comprises a vane 101 movable along a spindle 110 and rod 111 system located between two fixing members 112, a PCB 102 having a slot 1021 through which the vane 101 can move, and a plurality of opto-coupler pairs 103*a*-103*d* located at either side of the slot 1021. The opto-couplers 103*a*-103*d* emit and receive a signal 13 when not blocked and a signal 131 when blocked. In this particular example, the PCB 102 is connected at both top and bottom ends via wires.

In this particular example, the folding system 100 in the seat body 30 is coupled to a folding system 100 comprised in the leg body 40 (not shown). The folding systems 100 in the seat and leg body, 30, 40 are coupled and controlled by the same motor M1. This advantageously allows for the simultaneous folding/unfolding of both the seat and the leg bodies 30, 40. The following description of the folding and unfolding movements refer to the folding system 100 comprised in the seat body 30 however, the same applies to the folding system comprised in the leg body 40 and/or the footrest body 50 and/or the armrest body 60.

During a folding movement, the vane 101 moves through the slot 1021 in the PCB 102. When the seat body 30 is completely unfolded, the vane 101 blocks a first opto-coupler 103*a* generating a signal 131, whilst the other opto-couplers 103*b*-103*d* emit and receive signals 13. When the seat body 30 is completely folded, the vane 101 a blocks a further opto-coupler 103*d*. In this particular embodiment, the vane 101 blocks only one opto-coupler 101*a*, 101*b*, 101*c*, 101*d*, at any one time.

FIG. 5*b* shows the position of the vane 101 when blocking the opto-coupler 103*c*.

With reference to FIGS. 5*a* and 5*b*, table 1 below shows the implementation of the various speed profiles s1, s2, s3 in terms of their corresponding opto-coupler logic states.

TABLE 1

| Opto coupler 101a | Opto coupler 101b | Opto coupler 101c | Opto coupler 101d | Speed profile |
|---|---|---|---|---|
| 1 | 0 | 0 | 0 | acceleration |
| 0 | 1 | 0 | 0 | constant speed |
| 0 | 0 | 1 | 0 | deceleration |
| 0 | 0 | 0 | 1 | stop |

Logic Key:
1 = the movable vane 101 is blocking this particular opto-coupler
0 = the movable vane 101 is not blocking this particular opto-coupler.

These logic states are provided as illustrative examples and are not to be interpreted as restrictive in any way.

A control unit (C1) is comprised in a drive unit of the stairlift 1 and is adapted to control the folding process. To begin a folding movement, a first speed profile s1 is initiated by the motor M1 (see FIG. 4*a*, 4*b*). The first opto-coupler 103*a* is blocked by the vane 101—shown in FIG. 5*a*. The folding begins with a gradual accelerating speed until the vane 101 blocks a second opto-coupler 103*b*. At this stage, a second speed profile s2 is initiated by the same motor M1, and the folding continues with a substantially constant speed until the vane 101 blocks a third opto-coupler 103*c*. Now a third speed profile s3 is initiated at the motor M1 and the folding movement continues with a decreasing speed until the vane 101 blocks a fourth opto-coupler 103*d*. This represents the completion of the folding movement.

An unfolding process follows the same sequence but in reverse, i.e., a first speed profile s1 is initiated at the motor M1, and will see an acceleration in speed as the vane 101 moves away from the fourth opto-coupler 103*d* to unblock it. A second speed profile s2 is then initiated and unfolding continues at a constant speed until the vane 101 no longer blocks the third opto-coupler 103*c*. A third speed profile s3 is initiated so that the unfolding proceeds at a decelerated speed until it unblocks the second opto-coupler 103*b*. The unfolding process is considered complete when the first opto-coupler 103*a* is the only opto-coupler that remains blocked.

In an embodiment of the invention not shown in the figures, the folding system 100 for folding the footrest body 50 is coupled to the already coupled folding systems for folding the seat body 30 and the leg body 40 in such a way that when the footrest body 50 is in the down position, and the seat body 30 and leg body 40 are folded up, the footrest body 50 will fold also. The footrest body 50 is controlled by a motor M2. It could also be that the footrest body 50 folds simultaneously with the seat and leg body 30, 40 if the required control signals are given at the respective motors M1, M2. When the folding of the footrest body 50 is coupled to the folding system for the seat body 30 as well as being coupled to the folding system for the leg body 40, the control unit C1 sends a control signal to the motor M1 and the motor M2 (see FIG. 4*a*, 4*b*) The folding system 100 for the footrest body 50 is the same as described for the seat body 30 in FIGS. 5*a*-5*b*. The folding and unfolding of the footrest 50 follows the same process, i.e., implements the same speed profiles s1, s2, s3, as outlined in any one of the embodiments presented in the previous figures.

In an embodiment of the invention not shown in the figures, the folding system 100 for the armrest body 60 is comprised within the armrest 60 and comprises a vane 101, a PCB 102 and a plurality of opto-couplers 103. The armrest body 60 is controlled by a motor M3. The folding and unfolding of the armrest 60 follows the same process, i.e., implements the same speed profiles, s1, s2, s3 as outlined in any one of the embodiments presented in the previous figures.

It is to be understood that aspects of the various embodiments described hereinabove may be combined with aspects of other embodiments while still falling within the scope of the present disclosure. Accordingly, the foregoing description is intended to be illustrative rather than restrictive. The assembly of the present disclosure described hereinabove is defined by the claims, and all changes that fall within the meaning and range of equivalency of the claims are to be embraced within their scope.

REFERENCE SIGNS LIST

1 stairlift
2 rail
3 stairs
4 first landing area
5 second landing area
6 stairlift unit
7 carrier
8 chair
9 folding mechanism
10 backrest body
13 signal
131 signal
20 base body
30 seat body
31 seat joint
40 leg body (connecting footrest body with seat body)
41 leg joint
50 footrest body
51 footrest joint
60 armrest body
100 folding system
101 vane
102 PCB
1021 slot
103*a-d* opto-coupler
110 spindle
111 rod
112 fixing member
D path of travel
S seat axis
L leg axis
F footrest axis
A armrest axis
C1 control unit
M1 motor
M2 motor
M3 motor
s1 first speed profile
s2 second speed profile
s3 third speed profile

What is claimed is:

1. A stairlift, comprising:
a rail;
a carrier configured to drive along said rail; and
a chair supported by said carrier, said carrier and said chair together defining a stairlift unit, said chair having:
a base body coupled to said carrier;
a seat body foldably coupled to said base body by a seat joint, and having a first folding system operatively coupled thereto that is configured to fold and unfold said seat body;
a leg body foldably coupled to said seat body by a leg joint, and having a second folding system operatively coupled thereto that is configured to fold and unfold said leg body;
a footrest body foldably coupled to said leg body by a footrest joint, and having a third folding system operatively coupled thereto that is configured to fold and unfold said footrest body;
a backrest body coupled to said base body; and
an armrest body foldably coupled to said backrest body,
wherein each of said first, second, and third folding systems are respectively operated by either a first motor or a second motor that are configured to control said respective folding systems according to a variable speed profile.

2. A method of controlling a stairlift, comprising:
providing a stairlift as described in claim 1;
activating at least one of the first motor or the second motor;
operating said at least one activated first motor or second motor according to one of a first speed profile, a second speed profile, or a third speed profile, wherein at least the first and third speed profiles are variable speed profiles.

3. The method of claim 2, further comprising:
controlling the first folding system of the seat body and the second folding system of the leg body by the first motor.

4. The method of claim 2, further comprising:
controlling the folding system of the footrest body by the second motor.

5. The method of claim 1, further comprising:
implementing at least a first speed profile, a second speed profile, and a third speed profile in each of the first motor and second motor.

6. The method of claim 5, wherein the first speed profile and the third speed profile are variable speed profiles.

7. The method of claim 5, wherein the second speed profile is a constant speed profile or a variable speed profile.

8. The method of claim 2, wherein the first speed profile includes a speed acceleration.

9. The method of claim 2, wherein the second speed profile includes a constant speed or a variable speed.

10. The method of claim 2, wherein the third speed profile includes a speed deceleration.

11. The method of claim 2, further comprising:

activating at least one of the first motor or the second motor by one of a remote control device, or a control panel disposed on the stairlift unit.

12. The method of claim 2, further comprising:

operating one of said first motor or second motor to run through each of the first speed profile, the second speed profile, and the third speed profile, in successive order, so as to fold or unfold one or more of the seat body, leg body, or footrest body.

* * * * *